United States Patent
Dahm et al.

(10) Patent No.: US 10,704,209 B2
(45) Date of Patent: Jul. 7, 2020

(54) SLIPFORM PAVER AND METHOD FOR OPERATING A SLIPFORM PAVER

(71) Applicant: Wirtgen GmbH, Windhagen (DE)

(72) Inventors: Martin Dahm, Gieleroth (DE); Matthias Fritz, Hennef (DE); Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 16/288,271

(22) Filed: Feb. 28, 2019

(65) Prior Publication Data

US 2019/0276992 A1    Sep. 12, 2019

(30) Foreign Application Priority Data

Mar. 9, 2018  (DE) .................. 10 2018 105 536

(51) Int. Cl.
  *E01C 19/48*   (2006.01)
  *B62D 15/02*   (2006.01)
  (Continued)

(52) U.S. Cl.
  CPC ........ *E01C 19/4893* (2013.01); *B62D 15/025* (2013.01); *E01C 19/004* (2013.01);
  (Continued)

(58) Field of Classification Search
  CPC ........ E01C 19/004; E01C 19/40; E01C 19/42; E01C 19/4886; E01C 19/4893;
  (Continued)

(56) References Cited

U.S. PATENT DOCUMENTS

| 3,749,505 | A | 7/1973 | Miller et al. |
| 4,197,032 | A | 4/1980 | Miller |

(Continued)

FOREIGN PATENT DOCUMENTS

| DE | 19957048 C1 | 8/2001 |
| DE | 102009059106 A1 | 6/2011 |
| DE | 102012001289 A1 | 7/2013 |
| EP | 2620547 A1 | 7/2013 |

OTHER PUBLICATIONS

Steer-by-wire system of an agro-hybrid vehicle with single wheel drive, Jürgen Karner, Rafael Eder, Thomas Holzer, Johann Wieser and Heinrich Prankl, Landtechnik 69(2), 2014 (not prior art).

(Continued)

*Primary Examiner* — Raymond W Addie
(74) *Attorney, Agent, or Firm* — Lucian Wayne Beavers; Gary L. Montle; Patterson Intellectual Property Law, PC

(57) ABSTRACT

A slipform paver comprises a machine frame carried by rolling assemblies, at least two of which being drivable and at least one being steerable, as well as comprising a support arranged on the machine frame for a slipform mould and a controller for controlling the rolling assemblies to adjust the velocities of the drivable rolling assemblies and the steering angles of the one or more steerable rolling assemblies. The controller is configured such that, when the steering angles of the one or more steerable rolling assemblies change, the velocities of the drivable rolling assemblies are adjusted so as to reduce the change in the velocity at which a reference point referring to the support for the slipform mould will move along a predefined trajectory, said change in velocity being caused by changing the steering angle. The quality of the concrete profile produced by the slipform paver is thereby improved.

19 Claims, 4 Drawing Sheets

(51) Int. Cl.
*G05D 1/02* (2020.01)
*E01C 19/00* (2006.01)
*E01C 19/42* (2006.01)
*E01C 19/40* (2006.01)

(52) U.S. Cl.
CPC .............. *E01C 19/40* (2013.01); *E01C 19/42* (2013.01); *E01C 19/4886* (2013.01); *G05D 1/0223* (2013.01); *G05D 1/0278* (2013.01); *E01C 2301/18* (2013.01); *G05D 2201/0202* (2013.01)

(58) Field of Classification Search
CPC .............. E01C 2301/18; B62D 15/025; G05D 1/0223; G05D 1/0278; G05D 2201/0202
USPC ........................ 404/75, 84.05, 118
See application file for complete search history.

(56) References Cited

U.S. PATENT DOCUMENTS

| | | |
|---|---|---|
| 6,481,924 B1 | 11/2002 | Smolders et al. |
| 8,888,402 B2 | 11/2014 | Fritz et al. |
| 9,598,080 B2 | 3/2017 | Fritz et al. |
| 2013/0189031 A1* | 7/2013 | Fritz ................. E01C 19/00 404/72 |
| 2016/0334804 A1* | 11/2016 | Webber ............... E02F 9/2045 |

OTHER PUBLICATIONS

European Search Report of corresponding EP 19 16 1239, dated May 10, 2019, 7 pages (not prior art).

German Office Action of corresponding patent application DE 10 2018 105 536.6, dated May 29, 2019, 7 pages (not prior art).

* cited by examiner

SLIPFORM PAVER AND METHOD FOR OPERATING A SLIPFORM PAVER

CROSS-REFERENCES TO RELATED APPLICATIONS

This application claims benefit of German Patent Application No. 10 2018 105 536.6 filed Mar. 9, 2018, and which is hereby incorporated by reference.

BACKGROUND

The invention relates to a self-driving slipform paver comprising a machine frame carried by rolling assemblies and vertically adjustable by means of lifting columns. The invention further relates to a method for operating a self-driving slipform paver comprising a machine frame carried by rolling assemblies and vertically adjustable by means of lifting columns.

DE 1 99 57 048 A1 describes a self-driving slipform paver that comprises a machine frame carried by two front and two rear rolling assemblies in the form of track assemblies. Said rolling assemblies are in the form of drivable and steerable rolling assemblies, so the slipform paver is able to perform translational and/or rotational motions on the substrate. The slipform paver furthermore includes a device (hereinafter referred to as "slipform mould" or "concrete mold") for shaping flowable material, in particular concrete. The slipform mould can be used to produce structures of varying design, for example protective concrete walls or water channels. The slipform mould is interchangeably secured to a support on the left or right side of the machine frame. The slipform paver further includes a control unit which is configured such that the velocities and the steering angles of the rolling assemblies are adjustable.

During operation, the slipform paver is intended to be controlled largely automatically and without significant interventions by the vehicle operator. When controlled automatically, the rolling assemblies are controlled in such a way that a reference point on the slipform paver or on the slipform mould will move along a predefined trajectory (target travel path), hence along the travel path or at a predefined spacing equidistant to said trajectory, in order to form a structure. The trajectory can in this case be described by individual segments which may comprise straight or curved lines.

One known method for controlling self-driving construction machines requires the use of a stringline in order to predefine the trajectory. The stringline is sensed by means of at least one sensor in order to be able to determine the position of the reference point on the slipform paver or on the slipform mould with reference to the stringline Slipform pavers can also be controlled by means of a total station for determining position, or a GNSS (Global Navigation Satellite System). Data describing the trajectory are calculated for use in this automatic control. These data can be coordinates in a coordinate system that is independent of the slipform paver. Said data calculation can take place by means of a computer in an office away from the construction site, or it can take place on the machine. During operation of the slipform paver, a continuous comparison is being made between the actual position of the slipform paver, or rather the slipform mould, and the desired position, with the result that the slipform mould moves along said trajectory.

Successful production of monolithic concrete profiles requires the continuous feeding of concrete into the slipform mould. Conveying systems, for example belt conveyors or auger conveyors, are provided for feeding the concrete. The concrete is transferred into the slipform mould via a chute and a receiving hopper. The concrete is compacted inside of the slipform mould by means of vibrators. A large number of input parameters will be considered in order to successfully produce concrete profiles. The finished concrete profiles should be characterized by stability, close tolerances, and seamless transitions.

BRIEF SUMMARY

An object of the invention is to provide a slipform paver in which largely automatic control is adequate for satisfying the quality requirements demanded of the concrete profile. A further object of the invention is to specify a method for operating a slipform paver, said method being used to satisfy the quality requirements demanded of the concrete profile.

These objects are achieved according to the invention by way of the features of the independent claims. The dependent claims relate to advantageous embodiments of the invention.

The slipform paver according to the invention comprises a machine frame carried by at least three rolling assemblies and vertically adjustable by means of lifting columns, at least two of said rolling assemblies being drivable and at least one rolling assembly being a steerable rolling assembly, said slipform paver also comprising a support for a slipform mould that is arranged on the machine frame. The slipform paver furthermore comprises a control unit (as may also be referred to herein as a "controller") for controlling the rolling assemblies that is configured in such a way that the velocities of the drivable rolling assemblies and the steering angle of the one steerable rolling assembly, or the steering angles of the steerable rolling assemblies, are adjustable.

Experience has shown that, particularly when following a curved path, the operation of a slipform paver places increased demands on the input parameter settings. In practice, when entering a curve from a straight section and when exiting a curve into a straight section, the vehicle operator is thereby required to make corrections to the predefined velocity of the slipform paver. Moreover, corrections are also necessary when the curvature of a curve changes, for example during the transition from a small curvature to a relatively large curvature, or vice versa.

The slipform paver according to the invention is characterized by a control unit which is configured such that, when the steering angle of the one steerable rolling assembly changes or the steering angles of the steerable rolling assemblies change, the velocities of the drivable rolling assemblies are adjusted so as to reduce the change in the velocity at which a reference point referring to the support for the slipform mould will move along a predefined trajectory, said change in velocity being caused by changing the steering angle. The control unit consequently counteracts any change in velocity of the reference point due to a curved path, thus making the movement of the slipform mould more uniform. The quality of the concrete profile produced by the slipform paver is improved as a result.

In this context, the term "reference point referring to the support for the slipform mould" is understood to mean a point of reference which determines the position of a reference point on the slipform mould mounted on the support. Said reference point can be located on the front or the rear (in the direction of work) of the slipform mould, or in the middle thereof. Preferably, the reference point will be assumed to be a point located on the longitudinal axis of the slipform mould, one preferably on the rear section of the slipform mould, hence at the outlet of the slipform mould.

The reference point can also be located adjacent to the longitudinal axis of the slipform mould. This is particularly advantageous if the slipform mould has an asymmetrical cross-section in order to be able to produce a concrete component having an asymmetrical cross-section.

The control unit can be configured such that the velocities of the drivable rolling assemblies are adjusted such that the velocity at which a reference point referring to the support for the slipform mould is moving along a predefined trajectory will be maintained regardless of changes within a certain range to the steering angle of the steerable rolling assembly, or to the steering angles of the steerable rolling assemblies.

If a slipform mould is, for example, mounted on the right side (in the direction of work) of the machine frame of the slipform paver, and the slipform paver is moving along a straight path, then the velocity of a reference point located, for example, on the machine frame between the left rear rolling assembly and the right rear rolling assembly is equal to the velocity of a reference point located on the slipform mould that is situated on the right side of the machine frame. When entering a right hand curve, the velocity of the reference point located on the slipform mould decreases because said reference point is located on the inside of the curve. Consequently, the path velocity of this reference point is less than the desired velocity that was defined in advance for travel in a straight line. The result of this insufficient velocity is an excessive quantity of concrete exiting the slipform mould. Experience has shown that the concrete will ooze out from the bottom of the slipform mould or from the rear of the slipform mould, hence from either side of the mold outlet. Entering a left hand curve causes the path velocity of the reference point to be greater than the desired velocity that was defined in advance for travel in a straight line, as a result of which the previously formed concrete structure will be torn apart.

The control unit for the slipform paver according to the invention, or rather the operation of the slipform paver as per the method according to the invention, ensures that the velocity of the slipform mould when entering a curve and travelling through a curve will not change, or at least that it will not change as much as without the control unit according to the invention, with the result that the velocity will lie within a certain range still along a tolerable range. In thus referring to a "certain range," this term can be understood to mean a range that lies between an upper limit and a lower limit. However, fixed limits need not be predefined for said control. So, in practice, the velocity of the reference point need not be constant, but can rather vary within certain boundaries.

Regardless of how the trajectory progresses, the control unit according to the invention permits the path velocity of the slipform mould to remain constant, or to at least remain within predefined boundaries, hence limiting, and preferably minimising, the change in velocity as a result of the curved path, thus making the movement of the slipform mould more uniform. Said velocity can be a velocity of the slipform paver that is predefined by the operator and ensures that the concrete profile satisfies quality requirements. Consequently, the transitional areas between straight and curved sections will not exhibit deficiencies in quality that are the result of excessive or insufficient speed.

A preferred embodiment of the slipform paver according to the invention provides a control unit which is configured such that the velocities of the rolling assemblies are adjusted such that a reference point referring to the support for the slipform mould will move along a predefined trajectory at a predefined reference velocity regardless of changes to the steering angle of the steerable rolling assembly, or the steering angles of the steerable rolling assemblies. This control concept permits the path velocity of the slipform mould to always remain constant, or at least largely constant, regardless of how the trajectory progresses. In practice, however, this manner of velocity control is not absolutely necessary. In practice, it may be sufficient for the control unit to be configured such that, when the direction of travel changes, the velocities of the rolling assemblies are decreased or increased according to the change in direction, hence only roughly adapting to how the path of travel progresses. The velocities of the rolling assemblies are adapted according to the change in the direction of travel, so the velocity is decreased or increased if the construction machine travels leftwards or rightwards. Depending on the degree to which the direction changes, hence the size of the steering angle, the velocity can be changed by a predefined amount, with the change in velocity increasing along with an increase in the steering angle. For example, correction factors with respect to the velocities of the rolling assemblies and depending on the change in direction as well as the amount the direction changes can be stored in a memory of the control unit. Said correction factors can be empirically determined during test drives.

In this context, the term "control" is understood to mean both control without feedback (open-loop) and control with feedback (closed-loop), in which the path velocity of the slipform mould, which must remain constant, is established as an actual value that is changed for a deviation from the desired target value (the reference velocity) so that the path velocity once again approaches the target value.

In a preferred embodiment of a slipform paver comprising a slipform mould arranged on the left side of the machine frame, the control unit is configured such that the velocities of the rolling assemblies are increased when transitioning from travel in a straight line to a left hand curve, and decreased when transitioning from travel in a straight line to a right hand curve.

In an alternative preferred embodiment of a slipform paver comprising a slipform mould arranged on the right side of the machine frame, the control unit is configured such that the velocities of the rolling assemblies are decreased when transitioning from travel in a straight line to a left hand curve, and increased when transitioning from travel in a straight line to a right hand curve.

In order to adjust the velocities of the rolling assemblies, the control unit can be configured such that the velocity at which the reference point referring to the support for the slipform mould will move along a predefined trajectory is determined according to the steering angle of the steerable rolling assembly, or the steering angles of the steerable rolling assemblies, because the steering angle determines the radius of the curve travelled. If the steering angle is equal to zero, which corresponds to travel in a straight line, no correction to the velocity predefined for travel in a straight line need be made in terms of increasing or reducing said velocity. Travel along a curve begins when the rolling assembly or rolling assemblies actuate. When the rolling assembly actuates or the rolling assemblies actuate, movement of the slipform paver is subject to the requirement that the steering angle not be changed along a circular path whose radius depends on the steering angle. The amount by which the path velocity of the reference point referring to the slipform mould must be increased or decreased in order to again correspond to the velocity predefined for travel in a straight line can then be calculated according to known geometric relationships with respect to the steering angle. The velocities of the rolling assemblies are then adjusted so that the reference point moves at the desired path velocity. It should in this context be recognized that the rolling assemblies on the outside of the curve must move at a higher velocity than the rolling assemblies on the inside of the curve.

An embodiment of the slipform paver according to the invention provides a control unit that comprises a memory in which a correction factor is stored with respect to at least one predefined steering angle value for the at least one steerable rolling assembly. The control unit is configured such that the velocities of the drivable rolling assemblies are corrected according to the correction factor, or rather according to the correction factors, hence being decreased or increased. The correction factors can be stored with respect to various steering angles in the form of a table, in which specific steering angle values are each assigned a correction factor. In this case, the sign of the correction factor can determine whether the velocity is decreased or increased for the relevant steering angle.

In a further preferred embodiment, the control unit is configured such that the steering angles of the steerable rolling assemblies are adjusted such that lines extended in a perpendicular direction from the axles situated on said steerable rolling assemblies will intersect at one point. This also applies to the positions of the non-steerable rolling assemblies. Adjusting the steering angle in this way is known as Ackermann steering. In Ackermann steering, the velocity at which the reference point referring to the support for the slipform mould is moving along a predefined trajectory can easily be calculated according to the steering angle of the rolling assemblies on the basis of the distance between the reference point and the center of the circle around which the rolling assemblies are moving in a circular path.

The slipform paver is provided with at least three rolling assemblies, in which case said one rolling assembly can be arranged at the front or at the rear (in the direction of work). In an embodiment comprising four rolling assemblies, the two front rolling assemblies can be steerable rolling assemblies, and the two rear rolling assemblies can be non-steerable rolling assemblies. In principle, however, all of the rolling assemblies can be steerable rolling assemblies, and all of the rolling assemblies can be drivable rolling assemblies. The drivable rolling assemblies can each comprise a drive motor, for example a hydraulic motor, and the drivable, steerable rolling assemblies can each comprise a drive motor and a steering actuator, for example a hydraulic steering actuator, in particular a piston-cylinder unit.

The control unit can comprise a sensing unit for sensing a stringline. In this embodiment, the control unit is configured such that the steerable rolling assembly is (or the steerable rolling assemblies are) controlled such that a reference point referring to the slipform paver will move along a predefined trajectory. The reference point referring to the slipform paver can be a reference point referring to the support for the slipform mould or the slipform moulds. Control units of this kind are conventionally known. As a result, the progress of the stringline determines the steering angle, which in turn determines the amount by which the velocity of the reference point referring to the support for the slipform mould, or rather the slipform moulds, is corrected, hence being increased or decreased, and will be reached by means of a corresponding increase or decrease in the velocities of the rolling assemblies.

An alternative embodiment provides that the control unit comprises at least one satellite navigation system receiver for receiving satellite signals from a global navigation satellite system. In this embodiment, the control unit is configured such that, based on the satellite signals, the position of a reference point referring to the slipform paver is determined in a coordinate system independent of the construction machine, and the control unit is configured such that the steerable rolling assembly or the steerable rolling assemblies are controlled such that the reference point referring to the slipform paver will move along a predefined trajectory. Control units of this kind are conventionally known. Since the satellite-based control is providing the relevant data regarding position and direction in a coordinate system, the velocity at which the reference point referring to the slipform mould is moving can be determined in addition to the associated path velocities of the rolling assemblies. Regarding velocity control, the velocity of the reference point referring to the support for the slipform mould, which is determined by means of the satellite navigation system, can be compared using a predefined reference value (target value) in order to adjust the velocities of the drivable rolling assemblies so that the actual value will approach the target value.

The control unit of the slipform paver according to the invention can comprise various components or assemblies for actuating the rolling assemblies, in particular drive motors or steering actuators. The control unit can be a part of a slipform paver central control unit, which runs a control program in order to control the drive motors or steering actuators of the rolling assemblies. For example, the control unit can include a Programmable Logic Control unit (PLC), which can comprise a micro-control unit that generates control signals for controlling the individual components.

BRIEF DESCRIPTION OF THE SEVERAL VIEWS OF THE DRAWINGS

An embodiment of the invention is explained in greater detail hereinafter with reference to the drawings.

DETAILED DESCRIPTION

Figure 1:
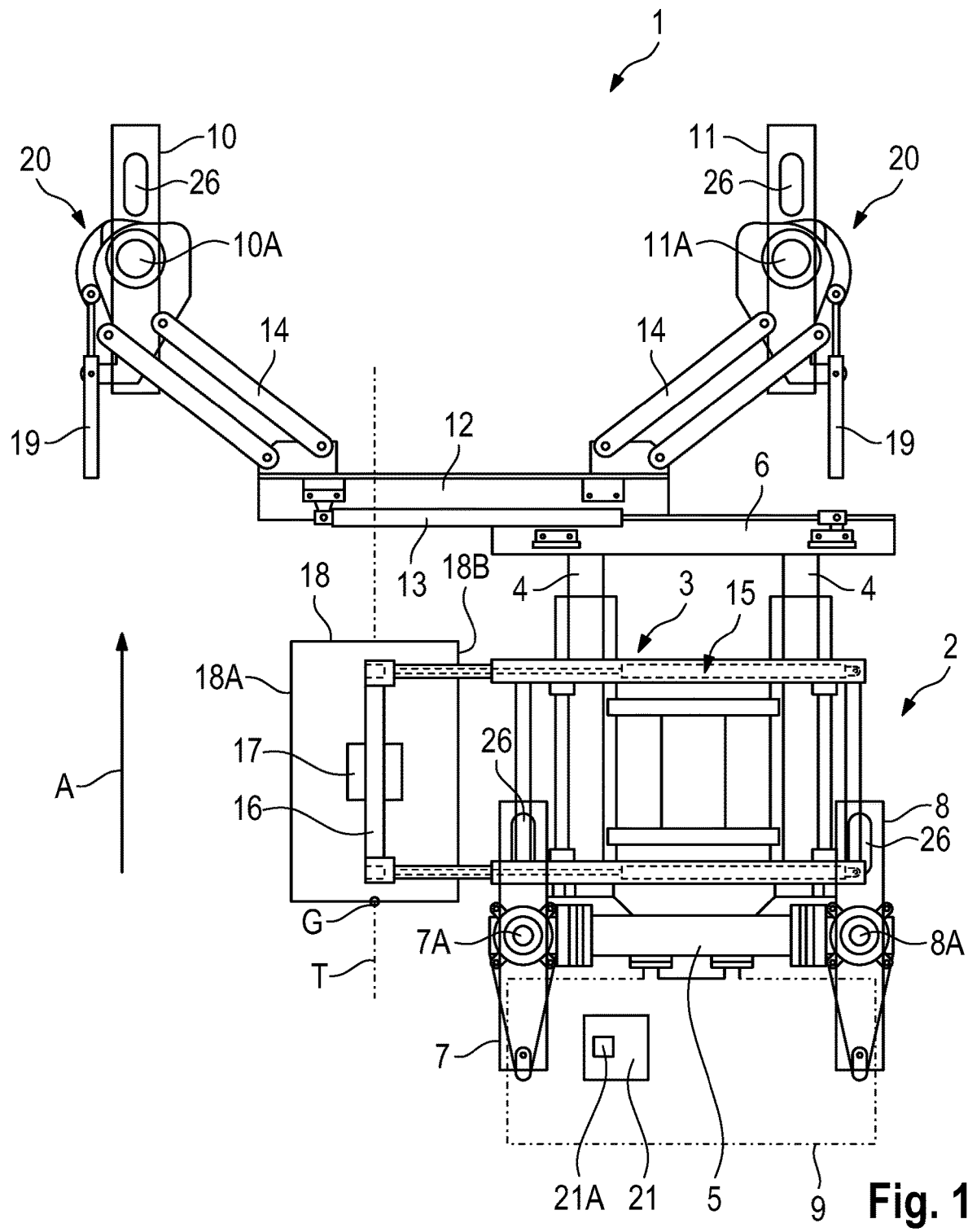
FIG. 1 is a plan view of an embodiment of a slipform paver, in which case the slipform mould is arranged on the left side (in the direction of work) of the slipform paver.

The invention is explained hereinafter by way of reference to a slipform paver that is described in detail in DE 199 57 048 A1, to which reference is expressly made. FIG. 1 shows a plan view of the slipform paver.

The slipform paver 1 consists of a chassis 2, which comprises a machine frame 3 having longitudinal beams 4 that extend parallel to the direction of work and are able to telescope from the machine frame 3, as well as transverse beams 5, 6 that extend normal to the direction of work. An arrow A is used to indicate the direction of work in FIG. 1. The rear (in the direction of work A) transverse beam 5 is rigidly attached to the machine frame 3. Attached to the rear (in the direction of work) transverse beam 5 are a left rear rolling assembly 7 and a right rear rolling assembly 8. Arranged between the rolling assemblies 7, 8 and the transverse beam 5 are hydraulically adjustable lifting columns 7A and 8A, which make the machine frame 3 vertically adjustable with respect to the substrate. The rolling assemblies 7, 8 can be track assemblies or wheels. Attached to the machine frame 3 behind (in the direction of work A) the transverse beam 5 is a drive unit 9, which provides hydraulic drive power to the hydraulic drive motors and actuators of the slipform paver.

The front (in the direction of work A) transverse beam 6 is rigidly attached to the telescoping longitudinal beams 4, which are able to telescope from the machine frame 3 in the direction of work A in order to alter, when required, the spacing between the rear rolling assemblies 7, 8 and the front rolling assemblies 10, 11.

Arranged on the front (in the direction of work A) transverse beam 6 is a sliding crossmember 12, which is able to slide parallel to the front transverse beam 6 with the aid of a piston-cylinder unit 13. Secured to the sliding crossmember 12 by way of pivoting units 14 are the left front rolling assembly 10 and the right front rolling assembly 11, which in the present embodiment are track assemblies. The pivoting units 14 permit adjustment of the track width. Arranged between the rolling assemblies 10, 11 and the pivoting units 14 are hydraulically adjustable lifting columns 10A and 11A, which make the machine frame 3 vertically adjustable with respect to the substrate.

The machine frame 3 comprises an intermediate frame 15 with a telescoping auxiliary frame 16, which can be displaced normal to the direction of work. Provided on the auxiliary frame 16 is a support 17 (shown only schematically), upon which a slipform mould 18 (shown only schematically) can be secured. The auxiliary frame 16 can be provided on the left or right side (in the direction of work A) of the machine frame 3, with the result that the slipform mould can be secured to the left or right side.

The slipform paver further comprises a conveying unit (not shown), for example a belt conveyor, which can be pivotably secured to the sliding crossmember 12.

The front and rear track assemblies 7, 8, 10, 11 are drivable, steerable rolling assemblies, each of which comprises a drive motor 26 (shown only schematically). In the present embodiment, the drive motors 26 of the rolling assemblies 7, 8, 10, 11 are hydraulic motors. Steering actuators comprising a piston-cylinder unit are used to adjust the steering angle of the front and rear track assemblies. FIG. 1 shows the piston-cylinder units 19 of the steering actuators 20 of the front rolling assemblies 10, 11.

A control unit 21 (shown only schematically) is provided for controlling the drive motors 26 and steering actuators 20. The control unit 21 is configured such that specific velocities and steering angles are adjustable with respect to the individual rolling assemblies 7, 8, 10, 11. In this context, the slipform paver is intended to move along a predefined trajectory T (target path). In specific, a reference point point G referring to the slipform mould is intended to move along said trajectory T, hence on the trajectory or at a predefined spacing equidistant to the trajectory. The steering angles of the rolling assemblies 7, 8, 10, 11 are correspondingly adjusted by the control unit 21 for this purpose.

In a first embodiment of the slipform paver, the control unit 21 comprises a sensing unit (not shown) for sensing a stringline (not shown), in which case the control unit 21 is configured such that the steerable rolling assemblies 7, 8, 10, 11 are controlled such that a reference point referring to the slipform paver, which in the present embodiment is assumed to be a reference point G referring to the slipform mould 18, will move along the predefined trajectory. In an alternative embodiment, the control unit 21 comprises a satellite navigation receiver (not shown) for receiving satellite signals from a global satellite navigation system, in which case the control unit 21 is configured such that, based on the satellite signals, the position of the reference point referring to the slipform paver, which in the present embodiment is the reference point G referring to the slipform mould 18, is determined in a coordinate system independent of the construction machine. The control unit 21 is further configured such that the steerable rolling assemblies 7, 8, 10, 11 are, based on a comparison between the actual position and the target position, controlled such that the reference point G referring to the support 17 for the slipform mould 18, will move along the trajectory T.

Since the control concepts described above are part of the prior art, the further description of known systems can be dispensed with. With respect to the invention, it is only of consequence that the control unit 21 adjusts the steering angle of the rolling assemblies 7, 8, 10, 11 such that the reference point G referring to the support 17 for the slipform mould 18 will move along the trajectory T, which can be predefined by means of either a stringline or a dataset. In this context, it should be kept in mind that, due to its "one-wheel drive", the slipform paver does not have a mechanical differential. As a result, the velocities of the individual rolling assemblies 7, 8, 10, 11 and the steering angles thereof must be controlled such that the slipform paver is able to perform the translational or rotational motions desired.

Figure 2:
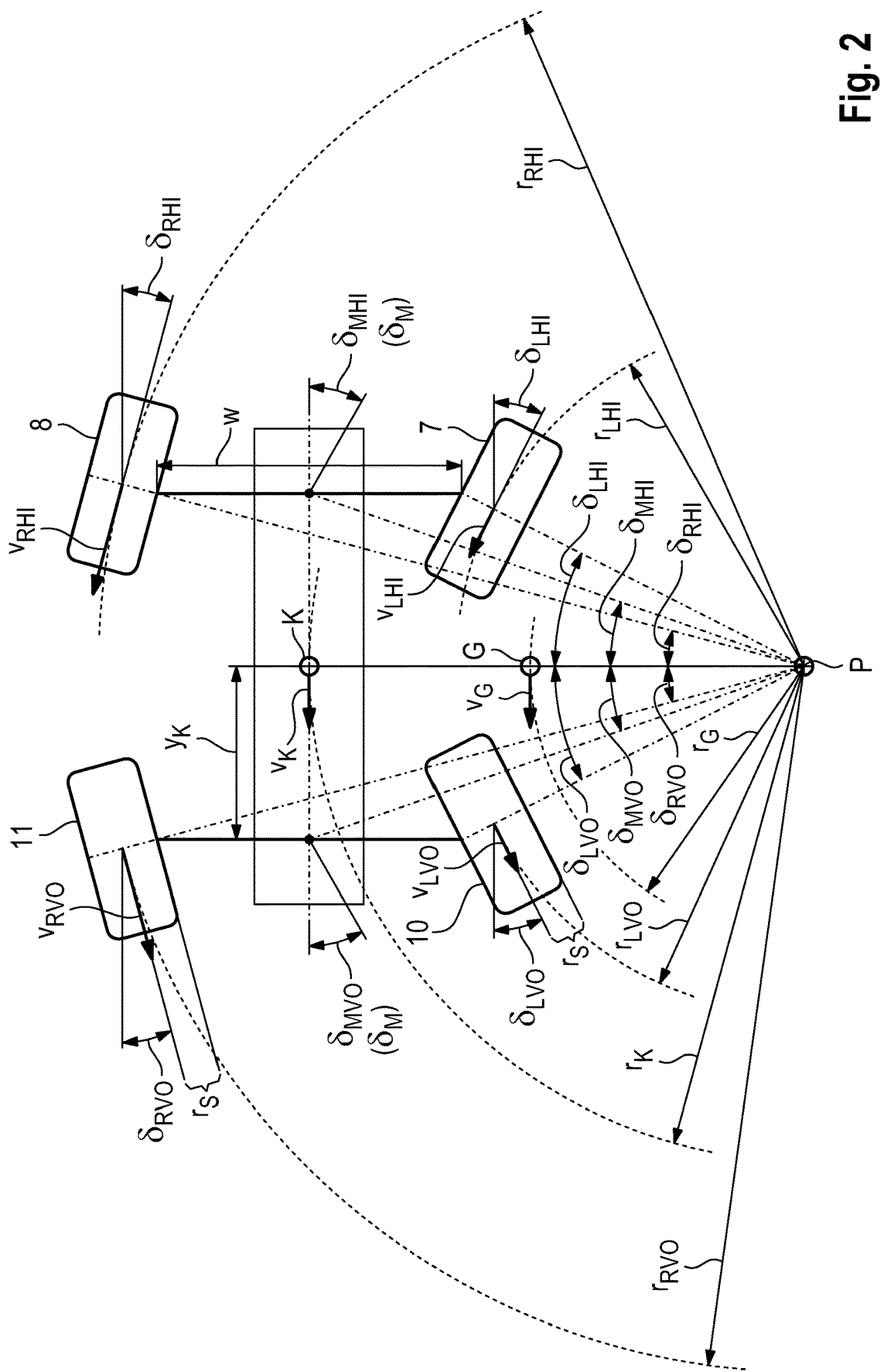
FIG. 2 is a highly simplified schematic illustration of the positions of the rolling assemblies of a vehicle comprising two steerable front rolling assemblies and two rear rolling assemblies during travel along a curved path.

With reference to FIG. 2, the theoretical basis for the steering system of the slipform paver is described hereinafter with respect to the general case of "four-wheel steering."

This steering model is described in detail in "Steer-by-wire system of an agro-hybrid vehicle with single wheel drive", Jurgen Kanner, Rafael Eder, Thomas Holzer, Johann Wieser and Heinrich Prankl, LANDTECHNIK 69(2), 2014. The rolling assemblies under consideration are wheels that rest upon a single wheel contact point on the substrate. FIG. 2 indicates the specific physical variables indicated by the following symbols:

$\delta_M$ Vehicle steering angle
$\delta_{MVO}$ Mean steering angle at the front axle
$\delta_{MHI}$ Mean steering angle at the front axle
$\delta_{RVO}$ Steering angle of the right front rolling assembly
$\delta_{LVO}$ Steering angle of the left front rolling assembly
$y_K$ Wheel base
w Distance of the kingpins
$\delta_{LHI}$ Steering angle of the left rear rolling assembly
$\delta_{RHI}$ Steering angle of the right rear rolling assembly
$r_K$ Turning radius of the vehicle reference point
$r_{LVO}$ Turning radius of the left front rolling assembly
$r_{LHI}$ Turning radius of the left rear rolling assembly
$r_{RVO}$ Turning radius of the right front rolling assembly
$r_{RHI}$ Turning radius of the right front rolling assembly
$r_G$ Turning radius of slipform mould reference point G
$v_{LVO}$ Velocity of the left front rolling assembly
$v_{LHI}$ Velocity of the left rear rolling assembly
$v_{RVO}$ Velocity of the right front rolling assembly
$v_{RHI}$ Velocity of the right rear rolling assembly
$v_G$ Velocity of slipform mould reference point G
$r_S$ Scrub radius
$v_K$ Vehicle reference velocity
K Vehicle reference point
P Instantaneous center The velocity of the slipform paver 1 is based on a reference point referred to hereinafter as vehicle reference point K. Vehicle reference point K, which is located on the longitudinal axis of the vehicle, differs from reference point G, which refers to the support 17 for the slipform mould 18 and, in the present embodiment, is located on the longitudinal axis of the slipform mould at the concrete mold outlet. The steering angles of the steerable rolling assemblies 7, 8, 10, 11 are intended to be adjusted such that lines extended in a perpendicular direction from the axles situated on the steerable rolling assemblies will intersect at the instantaneous center P (an Ackermann condition).

The mean steering angles are applied to the front and rear axles and have the same values:

$$|\delta_M|=|\delta_{MVO}|=|\delta_{MIH}| \qquad \text{(Equation 1)}$$

The individual wheel-steering angles can be calculated based on the wheel base and the track width reduced by the scrub radius:

$$\delta_{RVO} = \text{arccot}\left(\cot(\delta_M) + \frac{w}{2 \cdot y_K}\right) \qquad \text{(Equation 2)}$$

$$\delta_{LVO} = \text{arccot}\left(\cot(\delta_M) + \frac{w}{2 \cdot y_K}\right) \qquad \text{(Equation 3)}$$

In all-wheel steering, the steering angle values for the rolling assemblies (wheels) on the inside of the curve and the outside of the curve are equal:

$$|\delta_{LHI}|=|\delta_{LVO}| \qquad \text{(Equation 4)}$$

$$|\delta_{RHI}|=|\delta_{RVO}| \qquad \text{(Equation 5)}$$

The pole distance for vehicle reference point K is calculated using Equation 6:

$$r_K = \frac{y_K}{\tan(\delta_{MVO})} \qquad \text{(Equation 6)}$$

The turning radii of the individual rolling assemblies 7, 8, 10, 11 (wheels) are calculated using Equations 7 and 8:

$$r_{LVO} = r_{LHI} = \frac{y_K}{\sin(\delta_{LVO})} - r_S \qquad \text{(Equation 7)}$$

$$r_{RVO} = r_{RHI} = \frac{y_K}{\sin(\delta_{RVO})} - r_S \qquad \text{(Equation 8)}$$

The velocities of the individual rolling assemblies 7, 8, 10, 11 (wheels) are calculated using Equations 9 and 10:

$$v_{LVO} = v_{LHI} = v_K \cdot \frac{r_{LVO}}{r_K} \qquad \text{(Equation 9)}$$

$$v_{RVO} = v_{RHI} = v_K \cdot \frac{r_{RVO}}{r_K} \qquad \text{(Equation 10)}$$

Consequently, the velocities of the individual rolling assemblies 7, 8, 10, 11 (wheels) can be calculated by multiplying the predefined velocity for vehicle reference point K (vehicle reference velocity $v_K$) by a factor. It is evident that the rolling assemblies 8, 11 on the outside of the curve have a higher velocity than the rolling assemblies 7, 10 on the inside of the curve.

The control of a slipform paver according to the invention is described hereinafter with reference to FIGS. 3 and 4. Said control is performed by means of the control unit 21, which can, for example, comprise common processors, Digital Signal Processors (DSP) used for the continuous processing of digital signals, microprocessors, Application-Specific Integrated Circuits (ASIC), Field-Programmable Gate Arrays (FPGA), other integrated circuits (IC), or hardware components used to perform the individual method steps or computational steps for controlling the individual components, for example the hydraulic motors and steering actuators of the slipform paver. A data processing program (software) for performing said method steps or computational steps can run on the hardware components.

Figure 3:
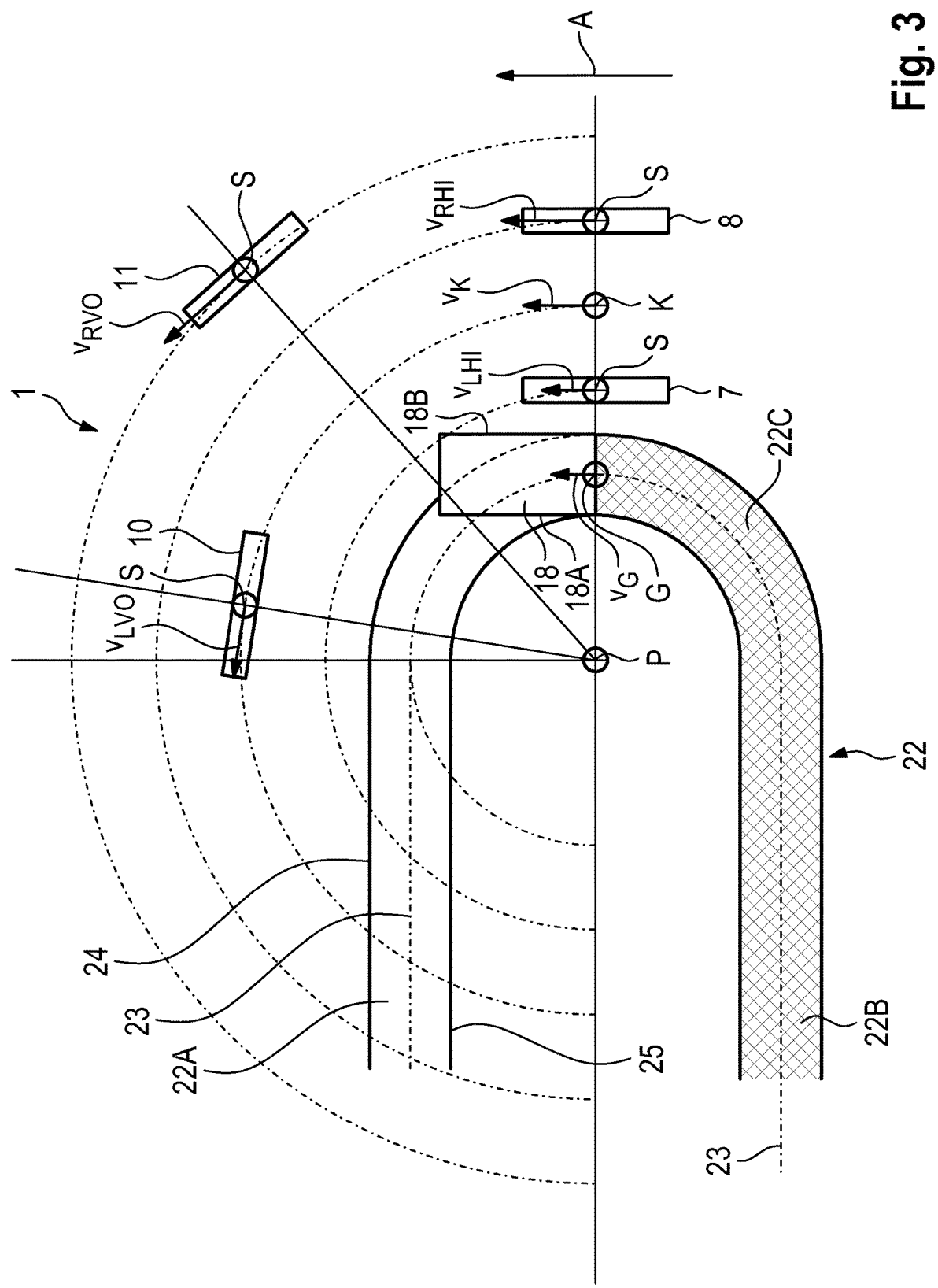
FIG. 3 is a highly simplified schematic illustration of the travel along a curved path of a slipform paver comprising two steerable front rolling assemblies and two non-steerable rear rolling assemblies, in which case the slipform paver is driving along a curved path to the left.

FIG. 3 shows the simplified case of steering only at (in the direction of work A) the left front rolling assembly 10 and the right front rolling assembly 11. For the sake of simplicity, it is assumed that the left rear rolling assembly 7 and the right rear rolling assembly 8 are non-steerable rolling assemblies. Also for the sake of simplicity, it is assumed that the rolling assemblies 7, 8, 10, 11, which may be track assemblies, rest upon a single contact point S on the substrate. Vehicle reference point K is located on the longitudinal axis of the slipform paver 1 at a central point between the left rear rolling assembly 7 and the right rear rolling assembly 8. Lines extended in a perpendicular direction from the axles situated on the steerable rolling assemblies will intersect at the instantaneous center P (an Ackermann condition). The lengths of velocity vectors $v_k$, $v_{LVO}$, $v_{LHI}$, $v_{RVO}$, $v_{RHI}$ of the rolling assemblies show that the rolling assemblies 8, 11 on the outside of the curve have a greater velocity than the rolling assemblies 7, 10 on the inside of the curve.

In the present embodiment, the slipform paver 1 is intended to be used to form a concrete profile 22 in the form of a traffic island with two straight sections 22A, 22B in the middle and two curved sections at the ends. FIG. 3 shows only one end of the curved section 22C. In the present embodiment, the curved sections are semi-circular sections, and the straight sections extend in parallel. However, the concrete profile 22 can also have a different contour, for example multiple curved sections of varying curvature in immediate succession, for example a left hand curve transitioning into a right hand curve, or vice versa.

The concrete profile already formed is indicated by shading. The slipform mould 18, which is secured to the support 17 (not shown) of the machine frame 3 (not shown), is only shown schematically in FIG. 3. The width of the slipform mould 18 matches the width of the concrete profile 22. The reference point G referring to the support 17 for the slipform mould 18 (hereinafter called slipform mould reference point G) is located on the "axle" of the rear rolling assemblies 7, 8 at a central point between the left and right side walls 18A, 18B at the mold outlet of the slipform mould 18 mounted on the support 17. However, any other given point on the slipform mould 18 can be assumed to be slipform mould reference point G. The slipform mould 18 is located on the left side (in the direction of work A) of the machine frame 3.

To form the straight section 22A of the concrete profile 22, the slipform paver 1 first travels straight ahead, so the steering angles of the front and rear rolling assemblies equal zero. Vehicle reference point K and slipform mould reference point G are travelling in the same direction and at the same velocity. This velocity $v_K$ can be predefined directly by the vehicle operator, or it can be a predefined velocity able to be changed by the vehicle operator. A control panel with switches or buttons and/or a screen, which can be in the form of a touchscreen, or other operating controls, e.g. joysticks, can be provided for this purpose. The control unit 21 steers the individual rolling assemblies 7, 8, 10, 11 so that, during travel in a straight line, all of the rolling assemblies have the same velocity (vehicle reference velocity $v_k$). Vehicle reference velocity $v_k$ is a velocity at which the quality requirements for the concrete profile 22 will be satisfied.

The control unit 21 is configured such that, during stringline-based control, the control unit continuously compares the current position of the slipform paver 1 with respect to the stringline (not shown), and the steering actuator 20 for the left front rolling assembly 10 and the right front rolling assembly 11 is controlled such that a reference point referring to the slipform paver (in order to simplify the illustration, this reference point is in the present embodiment equivalent to slipform mould reference point G) will move at a predefined spacing (equidistant) to the stringline, with the result that slipform mould reference point G will move along the center line 23 between the outer boundary lines 24, 25 of the concrete profile 22. However, control can also be provided using two reference points that refer to the slipform paver. During control using a satellite navigation system, the control unit 21 compares the actual coordinates with the target coordinates so that slipform mould reference point G will move along this line.

The travel in a straight line is followed by travel along a curve. FIG. 3 shows the position of the rolling assemblies 7, 8, 10, 11 at a point in time when the slipform paver 1 is travelling along a left hand curve. The turning radius determines the steering angle to be actuated. The control unit 21 is configured such that the velocities $v_{LVO}$, $v_{LHI}$, $v_{RVO}$, $v_{RHI}$ of the individual rolling assemblies are calculated using Equations 9 and 10. The control unit 21 is further configured such that the drive motors 26 of the individual rolling assemblies 7, 8, 10, 11 are controlled such that the rolling assemblies will move along a circular path at the calculated velocities $v_{LVO}$, $v_{LHI}$, $v_{RVO}$, $v_{RHI}$.

If the velocities $v_{LVO}$, $v_{LHI}$, $v_{RVO}$, $v_{RHI}$ of the individual rolling assemblies 7, 8, 10, 11 are calculated such that the reference vehicle velocity $v_k$ will not change during travel, i.e. the slipform paver will travel at the same velocity along a curve as it does in a straight line, then the slipform mould reference velocity $v_G$ will be less than the vehicle reference velocity $v_k$ during the curved section, which is shown in FIG. 3 by way of the corresponding velocity vectors. Since the reference point G referring to the slipform mould 18 on the inside of the curve has a velocity $v_G$ lower than that of vehicle reference point K, the slipform mould 18 will move at a lower velocity $v_G$ along a curve than the vehicle reference velocity $v_k$ that was predefined for the slipform paver by the vehicle operator.

In an embodiment, the control unit 21 of the slipform paver according to the invention is configured such that the velocities $v_{LVO}$, $v_{LHI}$, $v_{RVO}$, $v_{RHI}$ of the individual rolling assemblies 7, 8, 10, 11 are adjusted such that the slipform mould reference point $v_G$ will move along the predefined trajectory T at least largely regardless of changes to the steering angles of the steerable rolling assemblies and at a velocity that matches the vehicle reference velocity $v_k$ defined in advance. Calculation of the relevant values is performed on the basis of the steering model described above for the simplified case of steering only at the front rolling assemblies 10, 11, in which case the steering angles of the rear rolling assemblies 7, 8 are zero. The necessary equations or algorithms are implemented in the control unit 21 for this purpose. Since the velocity $v_G$ of the slipform mould 18 is also maintained during travel along a curve, the same input parameters are always present regardless of the contour of the concrete profile 22, thus enabling the production of a concrete profile meeting the expected quality criteria. Ideal results are able to be achieved by means of said control.

The control unit 21 of a slipform paver is able to implement a control concept in which the same velocity is specified for all of the rolling assemblies, said velocity corresponding to the vehicle reference velocity $v_k$. During travel along a curve, the velocities $v_{LVO}$, $v_{LHI}$, $v_{RVO}$, $v_{RHI}$ of the rolling assemblies 7, 8, 10, 11 are then corrected according to the steering angles, with the result that, instead of the vehicle reference point K, the slipform mould reference point G will move at the predefined vehicle reference velocity $v_k$ during the curve. Therefore, the control unit 21 calculates a correction factor for each rolling assembly 7, 8, 10, 11, which factor is obtained from the relationship of the distances (curve radius r) between the relevant rolling assemblies 7, 8, 10, 11 and the instantaneous center P.

Determination of the velocities $v_{LVO}$, $v_{LHI}$, $v_{RVO}$, $v_{RHI}$ of the rolling assemblies 7, 8, 10, 11 will be explained with reference to FIG. 4.

Figure 4:
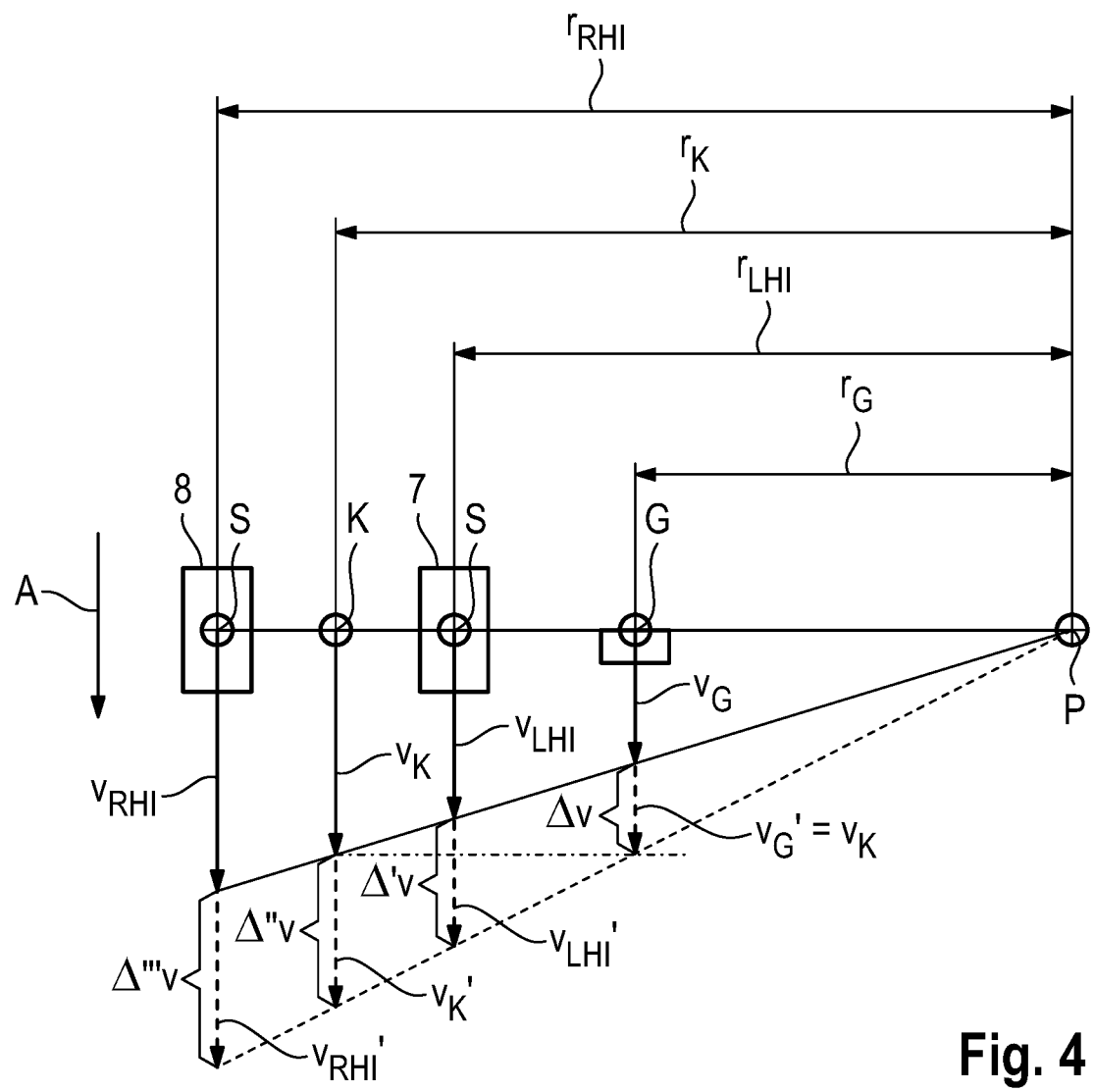
FIG. 4 is an illustration of the velocity vectors of the rear rolling assemblies of the slipform paver in FIG. 3.

The solid lines in FIG. 4 show the velocity vectors $v_{LHI}$ and $v_{RHI}$ of the rear rolling assemblies 7, 8 in the case where steering of the rolling assemblies is based on vehicle reference point K, in which case the velocity $v_k$ of vehicle reference point K while travelling in a straight line and the velocity $v_k$ of vehicle reference point K while travelling along the curve will be equal. In the travel along a curved path shown in FIG. 4, the rear rolling assembly 8 on the outside of the curve will have a higher velocity setting than the rear rolling assembly 7 on the inside of the curve. In order to determine the velocities for the rolling assembly 8, 7 on the outside and the inside of the curve, the vehicle reference velocity $v_k$ is multiplied by a factor that is larger by 1 for the rolling assembly on the outside of the curve and smaller by 1 for the rolling assembly on the inside of the curve. Slipform mould reference point G has the lowest velocity (slipform mould reference velocity $v_G$).

The dashed lines in FIG. 4 demonstrate the case where, by means of the control according to the invention, the velocities $v_{LHI}$ and $v_{RHI}$ of the rear rolling assemblies 7, 8 are adjusted so that, during travel along a curve, the velocity $v_G$ of slipform mould reference point G will match the vehicle reference velocity $v_k$. To do so, the velocity $v_K$ of the rolling assemblies 7, 8 with respect to vehicle reference point K must be increased according to the steering angle. As a result, the velocities $v_{LHI}$ and $v_{RHI}$ of the left rear and right rear rolling assemblies 7, 8 must be increased. The dashed lines in FIG. 4 show that the control unit 21 must increase the velocities of the rolling assemblies for travel along a curved path by a certain amount Δv, Δv', Δv'', Δv''', with the result that the velocity $v_G$' of slipform mould reference point G will again match the vehicle reference velocity $v_k$ during travel along a curved path. The velocities adjusted by the control unit for the left rear rolling assembly 7 and the right rear rolling assembly 8 are indicated in FIG. 4 as v'$_{LHI}$ and v'$_{RHI}$, respectively. It is evident from FIG. 4 that the amounts Δv, Δv', Δv'', Δv''' by which the velocities of the rolling assemblies will be increased depend upon the turning radii r, hence the distance to the instantaneous center P. As a result, the position of the slipform mould in relation to the machine frame, which is variable in a direction normal to the machine frame by means of the telescoping auxiliary frame 16, also determines the amount of velocity change.

Different geometric relationships arise for the case where the slipform paver 1 is travelling along a right hand curve instead of a left hand curve. The slipform mould 18 would then be located on the side of the machine frame 3 to the outside of the curve instead of inside of the curve. If control of the velocities of the rolling assemblies 7, 8, 10, 11 is intended to take place in relation to vehicle reference point K, the velocity of the slipform mould 18 would increase instead of decrease when the slipform paver is travelling along the curve, but the control concept according to the invention would prevent this. Consequently, the control unit 21 decreases the velocity of the rolling assemblies 7, 8, 10, 11 so that the velocity $v_G$ of slipform mould reference point G when travelling along a curve will match the vehicle reference velocity $v_k$ that was defined in advance.

If the slipform mould is located on the right side (in the direction of work) instead of the left side, the relationships are reversed. The velocities of the rolling assemblies will be appropriately decreased when transitioning from travel in a straight line to a left hand curve and appropriately increased when transitioning from travel in a straight line to a right hand curve. The adjustment of rolling assembly velocities takes place in a similar fashion when transitioning from a left hand curve to a right hand curve. The adjustment of rolling assembly velocities also takes place in a similar fashion when transitioning from any curves having varying curvatures.

An embodiment of the slipform paver according to the invention which is particularly easy to implement provides a control unit 21 that comprises a memory 21A, in which a correction factor $K_n$ is stored with respect to at least one predefined steering angle value by which the at least one steerable rolling assembly 7, 8, 10, 11 will be adjusted. In the simplest case, a steering angle of, for example, 10° can be assigned a correction factor K. If the steering angle to be adjusted is, for example, less than 10°, the control unit will apply no correction to the velocities of the drivable rolling assemblies. However, if the steering angle to be adjusted is greater than or equal to 10°, the control unit will apply a correction to the velocities using the correction factor K. If the correction factor K is, for example, 10%, the control unit will increase or decrease the velocities of the drivable rolling assemblies by 10%. Various steering angles, for example 10°, 20°, 30° or 40° can, in the form of a table, each be assigned a correction factor $K_1$, $K_2$, $K_3$, $K_4$ of, for example, 10%, 20%, 30% or 40%. If the steering angle is, for example, greater than or equal to 10° and less than 20°, then the velocities of the drivable rolling assemblies will be increased or decreased by 10%, and if the steering angle is, for example, greater than or equal to 20° and less than 30°, then the velocities of the drivable rolling assemblies will be increased or decreased by 20%.

What is claimed is:

1. A self-driving slipform paver comprising
   a machine frame carried by at least three rolling assemblies and vertically adjustable by means of lifting columns, two or more of said rolling assemblies being drivable, and one or more of said rolling assemblies being steerable;
   a support arranged on the machine frame for a slipform mould;
   a controller for controlling the rolling assemblies, wherein the controller is configured such that specific velocities of the drivable rolling assemblies and steering angles of the one or more steerable rolling assemblies are adjustable, and
   wherein the controller is configured, when the steering angles of the one or more steerable rolling assemblies change, to adjust the velocities of the drivable rolling assemblies so as to reduce the change in the velocity at which a reference point referring to the support for the slipform mould will move along a predefined trajectory, said change in velocity being caused by changing the steering angle.

2. The slipform paver of claim 1, wherein the controller is configured to adjust the velocities of the drivable rolling assemblies such that the reference point referring to the support for the slipform mould will move along a predefined trajectory at a predefined reference velocity regardless of changes to the steering angles of the one or more steerable rolling assemblies.

3. The slipform paver of claim 2, wherein the controller is configured such that the velocities of the drivable rolling assemblies are increased or decreased for a change to the steering angles of the one or more steerable rolling assemblies.

4. The slipform paver of claim 3, wherein said slipform paver is a slipform paver comprising a slipform mould arranged, in the direction of work, on the left side of the machine frame, and the controller is configured such that the velocities of the drivable rolling assemblies are increased when transitioning from travel in a straight line to a left hand curve, and decreased when transitioning from travel in a straight line to a right hand curve.

5. The slipform paver of claim 3, wherein said slipform paver is a slipform paver comprising a slipform mould arranged, in the direction of work, on the right side of the machine frame, and the controller is configured such that the velocities of the drivable rolling assemblies are decreased when transitioning from travel in a straight line to a left hand curve, and increased when transitioning from travel in a straight line to a right hand curve.

6. The slipform paver of claim 1, wherein the controller is configured such that the velocity at which the reference point referring to the support for the slipform mould will move along a predefined trajectory is determined according to the steering angles of the one or more steerable rolling assemblies.

7. The slipform paver of claim 1, wherein the controller is configured such that the steering angles of the one or more steerable rolling assemblies are adjusted such that lines extended in a perpendicular direction from axles situated on said one or more steerable rolling assemblies will intersect at one point.

8. The slipform paver of claim 1, wherein the drivable rolling assemblies each comprise a drive motor, and each of the one or more steerable rolling assemblies comprises a steering actuator.

9. The slipform paver of claim 1, further comprising at least one sensor for sensing a stringline, wherein the controller is configured such that the one or more steerable rolling assemblies are controlled such that a reference point referring to the slipform paver will move along a predefined trajectory.

10. The slipform paver of claim 1, further comprising at least one satellite navigation system receiver for receiving satellite signals from a global navigation satellite system, wherein the controller is configured such that:
    based on the satellite signals, the position of a reference point referring to the slipform paver is determined in a coordinate system independent of the construction machine, and
    the one or more steerable rolling assemblies are controlled such that said reference point referring to the slipform paver will move along a predefined trajectory.

11. The slipform paver of claim 1, wherein the controller comprises a memory in which one or more correction factors are stored with respect to at least one predefined steering angle value for said one or more steerable rolling assemblies, wherein the controller is configured such that the velocities of the drivable rolling assemblies are decreased or increased according to the one or more correction factors.

12. A method for operating a self-driving slipform paver comprising a machine frame carried by at least three rolling assemblies, at least two of which are drivable rolling assemblies, and comprising a support arranged on the machine frame for a slipform mould, wherein one or more of said rolling assemblies are steerable rolling assemblies, and the machine frame is vertically adjustable by means of lifting columns, the method comprising:

responsive to changes in the steering angles of the one or more steerable rolling assemblies, adjusting the velocities of the drivable rolling assemblies so as to reduce the change in a velocity at which a reference point referring to a support for the slipform mould will move along a predefined trajectory, said change in velocity being caused by changing the steering angle.

13. The method of claim 12, wherein the velocities of the drivable rolling assemblies are adjusted such that the reference point referring to the support for the slipform mould will move along the predefined trajectory at a predefined reference velocity regardless of changes to the steering angles of the one or more steerable rolling assemblies.

14. The method of claim 12, wherein the velocities of the drivable rolling assemblies are decreased or increased when the steering angles of the one or more steerable rolling assemblies change.

15. The method of claim 12, wherein the slipform paver is a slipform paver comprising a slipform mould arranged, in the direction of work, on the left side of the machine frame, wherein the velocities of the drivable rolling assemblies are increased when transitioning from travel in a straight line to a left hand curve, and decreased when transitioning from travel in a straight line to a right hand curve.

16. The method of claim 12, wherein the slipform paver is a slipform paver comprising a slipform mould arranged, in the direction of work, on the right side of the machine frame, wherein the velocities of the drivable rolling assemblies are decreased when transitioning from travel in a straight line to a left hand curve, and increased when transitioning from travel in a straight line to a right hand curve.

17. The method of claim 12, wherein the velocity at which the reference point referring to the support for the slipform mould will move along a predefined trajectory is determined according to the steering angles of the one or more steerable rolling assemblies.

18. The method of claim 12, further comprising sensing a stringline, wherein the one or more steerable rolling assemblies are controlled such that a reference point referring to the slipform paver will move along a predefined trajectory (T).

19. The method of claim 12, further comprising receiving satellite navigation signals from a global satellite system via at least one receiver of a satellite navigation system, wherein, based on said satellite signals, the position of a reference point referring to the slipform paver is determined in a coordinate system independent of the construction machine, and the one or more steerable rolling assemblies are controlled such that the reference point referring to the slipform paver will move along a predefined trajectory.

* * * * *